United States Patent Office 3,388,144
Patented June 11, 1968

3,388,144
POLYMERCAPTOORGANO AND POLYHYDROXY-
ORGANO SILANES AND SILOXANES
Martin C. Musolf and Edwin P. Plueddemann, Midland, Mich., assignors to Dow Corning Corporation, Midland, Mich., a corporation of Michigan
No Drawing. Filed July 15, 1965, Ser. No. 472,310
28 Claims. (Cl. 260—448.8)

This invention relates to new polymercaptoorgano and polyhydroxyorgano silanes and new polymercaptoorganosiloxanes, the latter being either homopolymers or copolymers.

More specifically, this invention relates to a silane having the general formula

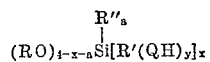

wherein each

R is a hydrocarbon radical free of aliphatic unsaturation, each
R' is selected from the group consisting of trivalent and tetravalent hydrocarbon, hydrocarbon ether, hydrocarbon thioether, hydrocarbon ester and hydrocarbon thioester radicals, R' being attached to the silicon atom via a silicon-carbon bond, each
R" is a monovalent hydrocarbon radical free of aliphatic unsaturation,
Q is selected from the group consisting of sulfur and oxygen atoms,
$a$ is an integer from 0 to 2,
$x$ is an integer from 1 to 2, the sum of $x$ and $a$ being from 1 to 3 inclusive, and
$y$ is an integer from 2 to 3.

The invention further relates to siloxanes containing units of the formula

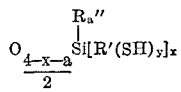

wherein, of course, R', R", $a$, $x$ and $y$ have the above defined meanings. The invention also relates to copolymeric siloxanes, as stated above, which contain at least one of the above defined siloxane units and conventional siloxane units of the formula

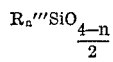

wherein each R''' is selected from the group consisting of monovalent hydrocarbon and monovalent halogenated hydrocarbon radicals free of aliphatic unsaturation, and $n$ is an integer from 0 to 3.

The silanes and siloxanes of this invention can be prepared by various processes as will be obivous to those skilled in the art. So far as is known at this time, the best method for preparing the silanes and siloxanes is by the reaction of a silane or siloxane containing one or two unsaturated or olefinic groups per silicon atom with a polymercapto carbon compound in the presence of a catalyst. Another method of preparation is the reaction of a silane containing one or two silicon-bonded hydrogen atoms per silicon atom with a polyhydroxylated carbon compound containing an unsaturated or olefinic group in the presence of a platinum catalyst. This type of reaction is well known to those skilled in the art and is described, for example, in U.S. Patent 2,823,218. Still another method of preparation is the reaction of a silane or siloxane containing one or two mercaptoalkyl groups per silicon atom with a polyhydroxylated carbon compound containing an unsaturated olefin group in the presence of a peroxide catalyst.

In the above formulae, R and R" can be any hydrocarbon radical free of aliphatic unsaturation. Thus, R and R" can be, for example, alkyl, cycloalkyl, aryl, alkaryl or aralkyl groups. Specific examples of such groups include the methyl, ethyl, propyl, isopropyl, butyl, amyl, octyl, decyl, dodecyl, octadecyl, myricyl, cyclopentyl, cyclohexyl, phenyl, xenyl, naphthyl, tolyl, xylyl, mesityl, ethylphenyl, benzyl, phenylethyl and the beta-phenylpropyl radicals. Preferred R and R" groups are those containing from 1 to 6 carbon atoms, especially the alkyl groups.

In the above formula the [R'(QH)$_y$] group can be any group in which R' is a trivalent or tetravalent hydrocarbon, hydrocarbon ether, hydrocarbon thioester radical. In these groups one valence of the R' radical is satisfied by its bonding to the silicon atom and the remaining two or three valences are satisfied by bonding to the mercapto or hydroxyl groups. Specific examples of the [R'(QH)$_y$] groups include the (HSCH$_2$)$_2$CHCH$_2$CH$_2$—, (HSCH$_2$CH$_2$)(HSCH$_2$)CH(CH$_2$)$_4$—
(HSCH$_2$CH$_2$)$_3$CCH$_2$CH$_2$—
(HSCH$_2$CH$_2$)(HSCH$_2$)CHCH(CH$_2$SH)CH$_2$CH$_2$CH$_2$—
HS(CH$_2$)$_5$CH(CH$_2$CH$_2$SH)CH$_2$CH$_2$CH(CH$_2$CH$_3$)—
(HSCH$_2$CH$_2$)$_2$CHCH$_2$CH$_2$—, (HSCH$_2$)$_2$CHSCH$_2$CH$_2$CH$_2$—
(HSCH$_2$)$_2$(C$_2$H$_5$)CCH$_2$SCH$_2$CH$_2$CH$_2$—
(HSCH$_2$)$_3$CCH$_2$SCH$_2$CH$_2$CH$_2$—
(HSCH$_2$)(HSCH$_2$CH$_2$CH$_2$)CHSCH$_2$CH$_2$CH$_2$—
(HSCH$_2$CH$_2$)$_2$CHCH$_2$SCH$_2$CH$_2$—
(HSCH$_2$)$_2$(C$_2$H$_5$)CCH$_2$SCH$_2$CH$_2$S(CH$_2$)$_3$—
(HSCH$_2$)$_3$CCH$_2$S(CH$_2$)$_3$S(CH$_2$)$_3$—

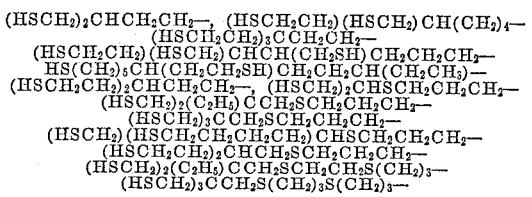

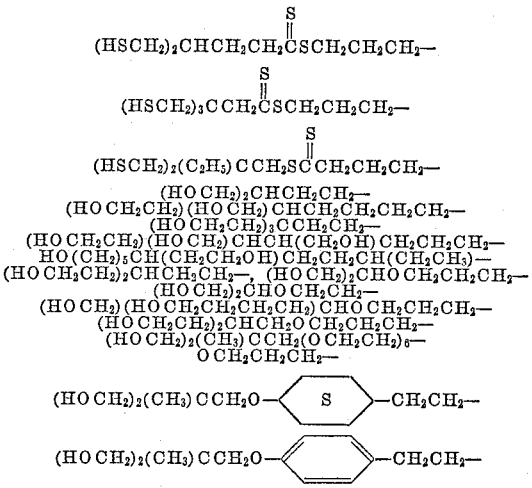

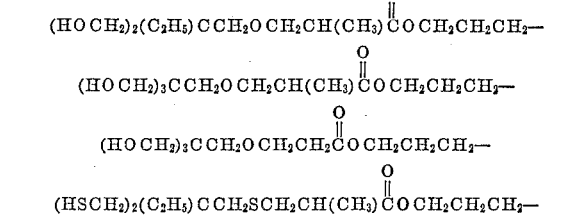

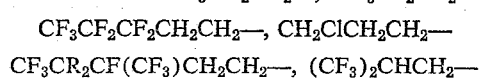

In the above formula R''' can be any monovalent hydrocarbon or monovalent halogenated hydrocarbon radical which is free of aliphatic unsaturation. Specific examples of such monovalent hydrocarbon radicals are set forth under the description of R and R" above. In addition, R''' can be any of the halogenated radicals which correspond to the hydrocarbon radicals already described. Thus, specifically, R''' can aslo be a halogenated alkyl radical such as a CF$_3$CH$_2$CH$_2$—, CF$_3$CF$_2$CH$_2$CH$_2$—, CF$_3$CF$_2$CF$_2$CH$_2$CH$_2$—, CH$_2$ClCH$_2$CH$_2$—
CF$_3$CR$_2$CF(CF$_3$)CH$_2$CH$_2$—, (CF$_3$)$_2$CHCH$_2$— or a C₇F₁₅CF₂CH₂— radical; a halogenated cycloalkyl radical such as a chloro or bromocyclohexyl radical; a halogenated aryl radical such as a bromophenyl, dichlorophenyl, chloronaphthyl, pentachloroxenyl or a perfluorophenyl radical; a halogenated alkaryl radical such as the α,α,α-trifluorotolyl radical; a halogenated aralkyl radical such as the dichlorobenzyl radical. Preferred R''' radicals are those containing from 1 to 18 carbon atoms.

The silanes of this invention are useful, for example, as primers or coupling agents for melamine, phenolic, urea or formaldehyde resins as well as primers for urethanes and other similar materials. The silanes and siloxanes of this invention are also useful as curing agents for isocyanate prepolymers, for preparing polyurethane rubbers and for making varnishes. Many other uses of the products of this invention will be obvious to those skilled in the art, particularly where a non-chain terminating reactant is desired.

In order that those skilled in the art may better understand how the present invention can be practiced, the following examples are given by way of illustration and not by way of limitation.

Example 1

50 g. of (HOCH₂)₂(CH₃CH₂)CCH₂OCH₂CH=CH₂ and 5 drops of a chloroplatinic acid solution containing 1% platinum were warmed to 100 °C. in a flask. Then 35 g. of HSi(OCH₃)₃ were added to the flask at such a rate that the temperature did not exceed 130° C. The product obtained was (HOCH₂)₂(CH₃CH₂)CCH₂O(CH₂)₃Si(OCH₃)₃

Example 2

The procedure of Example 1 was repeated except that 16 g. of (HOCH₂)₂(CH₃CH₂)CCH₂CH=CH₂ and 12 g. of HSi(OCH₃)₃ were employed. The product was (HOCH₂)₂(CH₃CH₂)C(CH₂)₃Si(OCH₃)₃

Example 3

108 g. of dry CH₂(OH)CH(OH)CH₂SH were placed in a flask and cooled to below 15° C. Then 155.4 g. of CH₂=CHSi(OCH₃)₃ were added to the flask over a period of about 37 minutes with agitation, the agitation being continued for about 73 minutes after addition of the silane was complete. About 18 minutes after the addition of the silane was complete, cooling of the flask was stopped and the product allowed to come to room temperature. The product, CH₂(OH)CH(OH)CH₂SCH₂CH₂Si(OCH₃)₃ was clear and colorless.

Example 4

91 g. of (CH₃O)₃SiCH₂CH₂SH and 86.5 g. of (HOCH₂)₂(CH₃CH₂)CCH₂OCH₂CH=CH₂ were placed in a quartz flask and the flask placed about 2 inches above an ultraviolet light for about 6 minutes. The reaction was exothermic, the temperature of the flask contents rising to about 91° C. The product was filtered and stripped to 80° C. at 1 mm. of mercury pressure to yield the clear, water white fluid (HOCH₂)₂(CH₃CH₂)CCH₂O(CH₂)₃
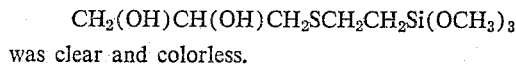
SCH₂CH₂Si(OCH₃)₃

Example 5

65.5 g. of

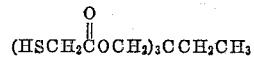
(HSCH₂COCH₂)₃CCH₂CH₃

27.3 g. of CH₂=CHSi(OCH₃)₃ and 0.32 g. of azobisisobutylnitrile were placed in a 300 ml. distilling flask, purged with nitrogen and then heated at 90° to 100° C. for about 2 hours. The product obtained was

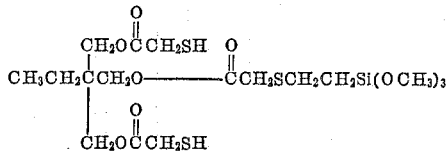

Example 6

When the following silanes are reacted with the specified polyhydroxylated or polymercaptoalkyl carbon compounds employing the procedures of the preceding examples, the indicated products are obtained.

| Silane | Carbon Compound | Product |
|---|---|---|
| (C₂H₅O)₂(C₂H₅)SiH | CH₂=CHCH₂OCH₂C(CH₂OH)₃ | (C₂H₅O)₂(C₂H₅)Si(CH₂)₃OCH₂C(CH₂OH)₃ |
| (C₃H₇O)₂(C₆H₅)Si(CH₂)₃SH | CH₂=CHCH₂OCH₂C(CH₂OH)₃ | (C₃H₇O)₂(C₆H₅)Si(CH₂)₃S(CH₂)₃OCH₂C(CH₂OH)₃ |
| (C₆H₅O)₃SiCH₂CH=CH₂ | (HSCH₂CH₂COCH₂)₃CCH₂CH₃ | (C₆H₅O)₃Si(CH₂)₃SCH₂CH₂COCH₃ 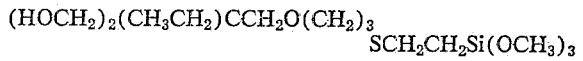 |
| (CH₃O)₂(C₁₈H₃₇)SiH | CH₂=CHC(CH₂CH₂OH)₃ | (CH₃O)₂(C₁₈H₃₇)SiCH₂CH₂C(CH₂CH₂OH)₃ |
| (CH₃O)(CH₃)₂SiCH=CH₂ | (HSCH₂)₄C | (CH₃O)(CH₃)₂SiCH₂CH₂SCH₂C(CH₂SH)₃ |
| (C₁₈H₃₇O)₃SiH | CH₂=CHCH₂OCH₂C(CH₂OH)₂(C₂H₅) | (C₁₈H₃₇O)₃Si(CH₂)₃OCH₂C(CH₂OH)₂(C₂H₅) |
| (CH₃O)₂SiH₂ | CH₂=CHCH₂C(CH₂OH)₂(C₂H₅) | (CH₃O)₂Si[(CH₂)₃C(CH₂OH)₂(C₂H₅)]₂ |
| (CH₃O)₂(C₁₂H₉)Si(CH₂)₃OC—C(CH₃)=CH₂ | (HSCH₂COCH₂)₃CC₂H₅ | (CH₃O)₂(C₁₂H₉)Si(CH₂)₃OCCH(CH₃)  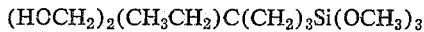 |

| Silane | Carbon Compound | Product |
|---|---|---|
| $(CH_3O)_3SiCH=CH_2$ | $(HSCH_2CH_2\overset{O}{\overset{\|}{C}}OCH_2)_3CCH_2CH_3$ | $(CH_3O)_3SiCH_2CH_2SCH_2CH_2\overset{O}{\overset{\|}{C}}OCH_2$—$\underset{\underset{CH_2OCCH_2CH_2SH}{\|}}{\overset{\overset{CH_2O\overset{O}{\overset{\|}{C}}CH_2CH_2SH}{\|}}{\overset{\|}{C}CH_2CH_3}}$ |
| $(CH_3O)_3SiCH=CH_2$ | $(HSCH_2)_3CC_2H_5$ | $(CH_3O)_3SiCH_2CH_2SCH_2\underset{\underset{CH_2SH}{\|}}{\overset{\overset{CH_2SH}{\|}}{C}}C_2H_5$ |
| $(CH_3O)_3SiCH=CH_2$ | $(HSCH_2)_4C$ | $(CH_3O)_3SiCH_2CH_2SCH_2C(CH_2SH)_3$ |
| $(CH_3O)_3SiCH=CH_2$ | $(HSCH_2\overset{O}{\overset{\|}{C}}OCH_2)_4C$ | $(CH_3O)_3SiCH_2CH_2SCH_2\overset{O}{\overset{\|}{C}}OCH_2C(CH_2O\overset{O}{\overset{\|}{C}}CH_2SH)_3$ |
| $(CH_3O)_3Si(CH_2)_3O\overset{O}{\overset{\|}{C}}CH=CH_2$ | $(HSCH_2)_3CCH_2CH_3$ | $(CH_3O)_3Si(CH_2)_3O\overset{O}{\overset{\|}{C}}CH_2CH_2SCH_2\underset{\underset{CH_2SH}{\|}}{\overset{\overset{CH_2SH}{\|}}{C}}CH_2CH_3$ |
| $(C_2H_5O)_3Si(CH_2)_3S\overset{O}{\overset{\|}{C}}CH=CH_2$ | $HSCH_2CH(OH)CH_2OH$ | $(C_2H_5O)_3Si(CH_2)_3S\overset{O}{\overset{\|}{C}}CH_2CH_2SCH_2CH(OH)CH_2OH$ |

Example 7

When siloxanes containing the units specified below are reacted with the specified polymercaptoalkyl carbon compounds employing the procedures of the preceding examples, the indicated products are obtained.

| Siloxane Units | Carbon Compound | Product Units |
|---|---|---|
| $CH_2=CH(CH_3)_2SiO_{1/2}$ | $(HSCH_2\overset{O}{\overset{\|}{C}}OCH_2)_3CCH_2CH_3$ | $HSCH_2\overset{O}{\overset{\|}{C}}OCH_2$<br>$CH_3CH_2\overset{\|}{C}CH_2O\overset{O}{\overset{\|}{C}}CH_2SCH_2CH_2(CH_3)_2SiO_{1/2}$<br>$HSCH_2\overset{\|}{CO}CH_2$<br>$\overset{\|}{O}$ |
| $(CH_3)_3SiO_{1/2}$<br>$CH_2=CH(CH_3)SiO$ | $(HSCH_2)_3CC_2H_5$ | $(CH_3)_3SiO_{1/2}$<br>$C_2H_5\underset{\underset{CH_2SH}{\|}}{\overset{\overset{CH_2SH}{\|}}{C}}CH_2SCH_2CH_2(CH_3)SiO$ |
| $(CH_3)_2SiO$<br>$(CH_3)(C_6H_5)SiO$<br>$CH_2=CH(CH_3)SiO$<br>$(CH_3)_2(C_6H_5)SiO_{1/2}$ | $(HSCH_2)_4C$ | $(CH_3)_2SiO$<br>$(CH_3)(C_6H_5)SiO$<br>$(HSCH_2)_3CCH_2SCH_2CH_2(CH_3)SiO$<br>$(CH_3)_2(C_6H_5)SiO_{1/2}$ |
| $(C_{18}H_{37})(CH_3)_2SiO_{1/2}$<br>$(C_2H_5)(CH_3)SiO$<br>$CH_2=CH(C_2H_5)SiO$ | $(HSCH_2CH_2\overset{O}{\overset{\|}{C}}OCH_2)_3CC_2H_5$ | $(C_{18}H_{37})(CH_3)_2SiO_{1/2}$<br>$(C_2H_5)(CH_3)SiO$<br>$HSCH_2CH_2\overset{O}{\overset{\|}{C}}OCH_2$<br>$C_2H_5\overset{\|}{C}—CH_2O\overset{O}{\overset{\|}{C}}CH_2CH_2SCH_2CH_2(C_2H_5)SiO$<br>$HSCH_2CH_2\overset{\|}{CO}CH_2$<br>$\overset{\|}{O}$ |
| $CH_2=CH(C_3H_7)SiO$ | | $(HSCH_2\overset{O}{\overset{\|}{C}}OCH_2)_3CCH_2O\overset{O}{\overset{\|}{C}}CH_2SCH_2CH_2(C_3H_7)SiO$ |
| $CH_2=CH(C_6H_{11})_2SiO_{1/2}$ | $(HSCH_2\overset{O}{\overset{\|}{C}}OCH_2)_4C$ | $(HSCH_2\overset{O}{\overset{\|}{C}}OCH_2)_3CCH_2O\overset{O}{\overset{\|}{C}}CH_2SCH_2CH_2(C_6H_{11})_2SiO_{1/2}$ |
| $CF_3CH_2(CH_3)SiO$<br>$(CH_3)_2SiO$<br>$CH_2=CH(CH_3)_2SiO_{1/2}$ | $(HSCH_2CH_2)_3CCH_2CH_3$ | $CF_3CH_2CH_2(CH_3)SiO$<br>$(CH_3)_2SiO$<br>$\underset{\underset{CH_2CH_2SH}{\|}}{\overset{\overset{CH_2CH_2SH}{\|}}{CH_3CH_2\overset{\|}{C}CH_2CH_2SCH_2CH_2(CH_3)_2SiO_{1/2}}}$ |

| Siloxane Units | Carbon Compound | Product Units |
|---|---|---|
| $(CH_3)_3SiO_{1/2}$<br>$SiO_2$<br>$ClCH_2CH_2CH_2CH_2(CH_3)SiO$<br>$C_6H_3Cl_2(CH_3)SiO$<br>$(CH_3)_2SiO$<br>$CH_2=CH(CH_3)SiO$ | $(HSCH_2\overset{O}{\overset{\|}{C}}OCH_2)_3CCH_2CH_3$ | $(CH_3)_3SiO_{1/2}$<br>$SiO_2$<br>$ClCH_2CH_2CH_2CH_2(CH_3)SiO$<br>$C_6H_3Cl_2(CH_3)SiO$<br>$(CH_3)_2SiO$<br><br>$HSCH_2\overset{O}{\overset{\|}{C}}OCH_2$<br>$CH_3CH_2\overset{\|}{C}CH_2O\overset{O}{\overset{\|}{C}}CH_2SCH_2CH_2(CH_3)SiO$<br>$HSCH_2\overset{\|}{C}OCH_2$<br>$\overset{\|}{O}$ |
| $CH_2=CH(C_3H_7)SiO$ | $(HSCH_2)_4C$ | $(HSCH_2)_3CCH_2SCH_2CH_2(C_3H_7)SiO$ |
| $CH_2=CH(CF_3C_6H_4)Si$ | $(HSCH_2)_3CC_2H_5$ | $CH_2SH$<br>$C_2H_5\overset{\|}{C}CH_2SCH_2CH_2(CF_3C_6H_4)SiO$<br>$\overset{\|}{CH_2SH}$ |
| $CH_2=CH(C_6H_5)(CH_3)SiO_{1/2}$ | $(HSCH_2\overset{O}{\overset{\|}{C}}OCH_2)_3CC_2H_5$ | $HSCH_2\overset{O}{\overset{\|}{C}}OCH_2\quad O$<br>$C_2H_5\overset{\|}{C}CH_2O\overset{\|}{C}CH_2SCH_2CH_2(C_6H_5)(CH_3)SiO_{1/2}$<br>$HSCH_2\overset{\|}{C}OCH_2$<br>$\overset{\|}{O}$ |
| $SiO_2$<br>$(CH_3)_3SiO_{1/2}$ | $(HSCH_2)_3CC_2H_5$ | $SiO_2$<br>$(CH_3)_3SiO_{1/2}$ |
| $CH_2=CH(CH_3)_2SiO_{1/2}$ | | $CH_2SH$<br>$C_2H_5\overset{\|}{C}CH_2SCH_2CH_2(CH_3)_2SiO_{1/2}$<br>$\overset{\|}{CH_2SH}$ |
| $(CH_3)_2SiO$<br>$CH_2=CH(CH_3)SiO$ | $(HSCH_2\overset{O}{\overset{\|}{C}}OCH_2)_3CC_2H_5$ | $(CH_3)_2SiO\quad O$<br>$HSCH_2\overset{\|}{C}OCH_2\quad O$<br>$C_2H_5\overset{\|}{C}CH_2O\overset{\|}{C}CH_2SCH_2CH_2(CH_3)SiO$<br>$HSCH_2\overset{\|}{C}OCH_2$<br>$\overset{\|}{O}$ |

That which is claimed is:

1. A silane having the general formula

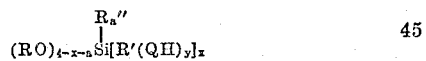

wherein each

R is a hydrocarbon radical free of aliphatic unsaturation, each

R' is selected from the group consisting of trivalent and tetravalent hydrocarbon, hydrocarbon ether, hydrocarbon thioether, hydrocarbon ester and hydrocarbon thioester radicals, R' being attached to the silicon atom via a silicon-carbon bond, each R'' is a monovalent hydrocarbon radical free of aliphatic unsaturation, Q is selected from the group consisting of sulfur and oxygen atoms, $a$ is an integer from 0 to 2, $x$ is an integer from 1 to 2, $y$ is an integer from 2 to 3, the sum of $x$ and $a$ being from 1 to 3.

2. A silane as defined in claim 1 wherein Q is a sulfur atom.

3. A silane as defined in claim 2 wherein R and R'' contain from 1 to 6 carbon atoms and $x$ is 1.

4. A silane as defined in claim 3 wherein $a$ is 0.

5. The silane

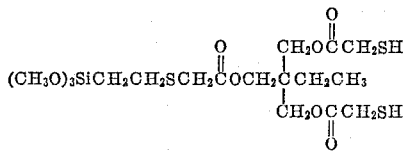

6. The silane

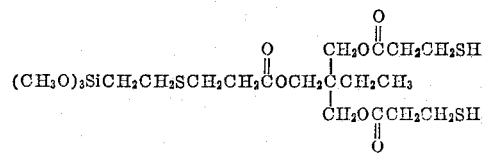

7. The silane

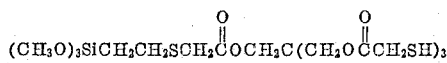

8. The silane

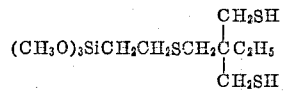

9. The silane $(CH_3O)_3SiCH_2CH_2SCH_2C(CH_2SH)_3$.

10. The silane

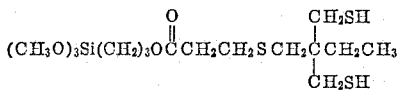

11. A silane as defined in claim 1 wherein Q is an oxygen atom.

12. A silane as defined in claim 11 wherein R and R'' contain from 1 to 6 carbon atoms and $x$ is 1.

13. A silane as defined in claim 12 wherein $a$ is 0.

14. The silane

$(CH_3O)_3Si(CH_2)_3OCH_2C(CH_2CH_3)(CH_2OH)_2$

15. The silane

$(CH_3O)_3Si(CH_2)_3C(CH_2CH_3)(CH_2OH)_2$

16. The silane (CH$_3$O)$_3$SiCH$_2$CH$_2$SCH$_2$CH(OH)CH$_2$OH

17. The silane (CH$_3$O)$_3$SiCH$_2$CH$_2$S(CH$_2$)$_3$OCH$_2$C(CH$_2$CH$_3$)(CH$_2$OH)$_2$ 18. A siloxane containing units of the general formula $$O_{\frac{4-x-a}{2}}\overset{R''_a}{\underset{}{Si}}[R'(SH)_y]_x$$

wherein each

R' is selected from the group consisting of trivalent and tetravalent hydrocarbon, hydrocarbon ether, hydrocarbon thioether, hydrocarbon ester and hydrocarbon thioester radicals, R' being attached to the silicon atom via a silicon-carbon bond, each R'' is a monovalent hydrocarbon radical free of aliphatic unsaturation, $a$ is an integer from 0 to 2,
$x$ is an integer from 1 to 2,
$y$ is an integer from 2 to 3,
the sum of $x$ and $a$ being from 1 to 3.

19. A siloxane as defined in claim 18 wherein R'' contains from 1 to 6 carbon atoms and $x$ is 1.
20. A siloxane as defined in claim 19 wherein $a$ is 1.
21. A siloxane as defined in claim 19 wherein $a$ is 2.
22. A siloxane containing units of the formula

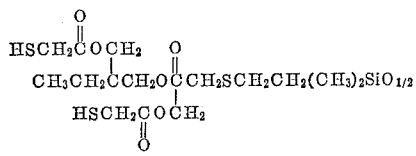

23. A siloxane containing units of the formula

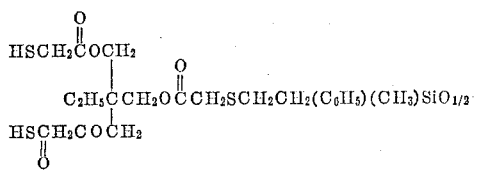

24. A siloxane containing units of the general formula $$O_{\frac{4-x-a}{2}}\overset{R''_a}{\underset{}{Si}}[R'(SH)_y]_x$$

wherein each

R' is selected from the group consisting of trivalent and tetravalent hydrocarbon, hydrocarbon ether, hydrocarbon thioether, hydrocarbon ester and hydrocarbon thioester radicals, R' being attached to the silicon atom via a silicon-carbon bond, each R'' is a monovalent hydrocarbon radical free of aliphatic unsaturation, $a$ is an integer from 0 to 2,
$x$ is an integer from 1 to 2,
$y$ is an integer from 2 to 3,
the sum of $x$ and $a$ being from 1 to 3,
and siloxane units of the general formula $$\frac{R'''_nSiO_{4-n}}{2}$$

wherein each R''' is selected from the group consisting of monovalent hydrocarbon and monovalent halogenated hydrocarbon radicals free of aliphatic unsaturation, and $n$ is an integer from 0 to 3.

25. A siloxane as defined in claim 24 wherein R'' contains from 1 to 6 carbon atoms, $x$ is 1, R''' contains from 1 to 18 carbon atoms and $n$ has an average value of about 2.
26. A siloxane as defined in claim 25 wherein $a$ is 1.
27. A siloxane containing units of the formula

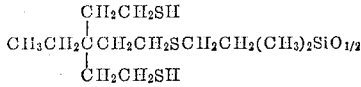

and siloxane units of the formulae CF$_3$CH$_2$CH$_2$(CH$_3$)SiO and (CH$_3$)$_2$SiO.

28. A siloxane containing units of the formula

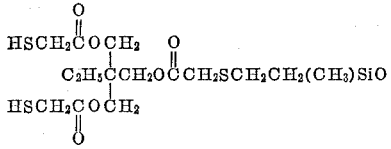

and siloxane units of the formula (CH$_3$)$_2$SiO.

References Cited
UNITED STATES PATENTS

| | | | |
|---|---|---|---|
| 2,629,727 | 2/1953 | Speier. | |
| 3,328,451 | 6/1967 | Bulbenko | 260—448.8 |
| 3,345,393 | 10/1967 | Simmler et al. | |
| 3,355,473 | 11/1967 | Clark et al. | 260—448.2 |

TOBIAS E. LEVOW, *Primary Examiner.*

P. F. SHAVER, *Assistant Examiner.*